United States Patent
Banister et al.

(10) Patent No.: US 9,736,707 B2
(45) Date of Patent: Aug. 15, 2017

(54) ENERGY SAVING MODE WITH MAINTAINED NUMBER OF ADVERTISED TRANSMIT ANTENNAS

(71) Applicant: QUALCOMM Incorporated, San Diego, CA (US)

(72) Inventors: Brian Clarke Banister, San Diego, CA (US); Matthias Brehler, Boulder, CO (US); Peter Gaal, San Diego, CA (US); Masato Kitazoe, Tokyo (JP); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 14/013,438

(22) Filed: Aug. 29, 2013

(65) Prior Publication Data

US 2014/0003278 A1    Jan. 2, 2014

Related U.S. Application Data

(62) Division of application No. 13/164,572, filed on Jun. 20, 2011, now Pat. No. 8,548,511.

(60) Provisional application No. 61/357,019, filed on Jun. 21, 2010.

(51) Int. Cl.
  *H04W 24/08*    (2009.01)
  *H04B 7/06*     (2006.01)
  *H04W 72/04*    (2009.01)

(52) U.S. Cl.
  CPC .......... *H04W 24/08* (2013.01); *H04B 7/0691* (2013.01); *H04B 7/0608* (2013.01); *H04W 72/042* (2013.01); *H04W 72/046* (2013.01); *Y02B 60/50* (2013.01)

(58) Field of Classification Search
  CPC .......... H04W 72/042; H04W 72/0413; H04W 24/10; H04W 72/0406; H04W 72/04; H04W 24/08; H04W 72/0453; H04W 24/02; H04W 72/044; H04W 72/0426; H04W 72/085; H04W 84/045
  See application file for complete search history.

(56) References Cited

U.S. PATENT DOCUMENTS

| | | |
|---|---|---|
| 2005/0250452 A1 | 11/2005 | Walton et al. |
| 2006/0210004 A1* | 9/2006 | Yellapantula et al. ........ 375/354 |
| 2007/0064830 A1 | 3/2007 | Choi et al. |

(Continued)

FOREIGN PATENT DOCUMENTS

| | | |
|---|---|---|
| JP | 2006042075 A | 2/2006 |
| JP | 2008017096 A | 1/2008 |

(Continued)

OTHER PUBLICATIONS

R2-103403, "Changing number of antenna for energy saving", May 2010.*

(Continued)

*Primary Examiner* — Charles C Jiang
*Assistant Examiner* — Oussama Roudani
(74) *Attorney, Agent, or Firm* — Patterson & Sheridan, LLP

(57) ABSTRACT

Certain aspects of the present disclosure provide techniques for wireless communications, wherein first number of transit antennas is advertised, but a different number of transmit antennas are actually used for transmission.

12 Claims, 7 Drawing Sheets

(56) References Cited

U.S. PATENT DOCUMENTS

| | | | |
|---|---|---|---|
| 2007/0135161 A1 | 6/2007 | Molnar et al. | |
| 2008/0267056 A1* | 10/2008 | Aryanfar et al. | 370/203 |
| 2008/0292012 A1 | 11/2008 | Kim et al. | |
| 2008/0303701 A1* | 12/2008 | Zhang et al. | 341/106 |
| 2009/0060088 A1 | 3/2009 | Callard et al. | |
| 2009/0080547 A1 | 3/2009 | Naka et al. | |
| 2009/0129498 A1* | 5/2009 | Nakamura et al. | 375/267 |
| 2010/0056215 A1 | 3/2010 | Gorokhov et al. | |
| 2010/0056217 A1 | 3/2010 | Montojo et al. | |
| 2010/0067599 A1 | 3/2010 | Dayal et al. | |
| 2010/0069122 A1* | 3/2010 | Ito | H04B 7/0684 455/562.1 |
| 2010/0195636 A1 | 8/2010 | Nakashima et al. | |
| 2010/0296816 A1* | 11/2010 | Larsen | 398/116 |
| 2010/0302978 A1 | 12/2010 | Roh et al. | |
| 2011/0199986 A1* | 8/2011 | Fong et al. | 370/329 |
| 2011/0312353 A1 | 12/2011 | Banister et al. | |
| 2012/0014349 A1 | 1/2012 | Chung et al. | |
| 2012/0039256 A1 | 2/2012 | Kwon et al. | |
| 2012/0076102 A1 | 3/2012 | Ko et al. | |
| 2012/0122407 A1* | 5/2012 | Allpress et al. | 455/67.11 |

FOREIGN PATENT DOCUMENTS

| | | |
|---|---|---|
| JP | 2009027211 A | 2/2009 |
| JP | 2010219817 A | 9/2010 |
| WO | WO-2007004490 A1 | 1/2007 |
| WO | WO-2007023524 A1 | 3/2007 |
| WO | WO-2009038074 A1 | 3/2009 |
| WO | 2010025268 | 3/2010 |
| WO | 2010025286 | 3/2010 |
| WO | WO-2010033411 A1 | 3/2010 |

OTHER PUBLICATIONS

3GPP TSG RAN WG2#67, "Number of antenna's change", R2-094851 Shenzhen, China, Aug. 24-28, Samsung, Discussion and decision, http://www.3gpp.org/ftp/tsg_ran/WG2_RL2/TSGR2_67/docs/R2-094851.zip.

Alcatel-Lucent et al., "eNB Energy Saving Possibilities in Times of Reduced Cell Traffic", 3GPP Draft; R1-100952 ENB_Energ Sav in_Red Traffic_Tim E_V3.3, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Feb. 22, 2010, Feb. 16, 2010 (Feb. 16, 2010), XP050418543, [retrieved on Feb. 16, 2010].

Chttl: "Radio Resource Utilization Efficiency in LTE-A", 3GPP Draft; R1-102390, 3rd Generation Partnership Project (3GPP), Mobile Competence Centre ; 650, Route Des Lucioles ; F-06921 Sophia-Anti Polis Cedex ; France, vol. RAN WG1, no. Beijing, china; Apr. 12, 2010, Apr. 8, 2010 (Apr. 8, 2010), XP050419738, [retrieved on Apr. 8, 2010].

Huawei: "Energy saving techniques for LTE", 3GPP Draft; R2-101824 Energy Saving Techniques for LTE, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; Feb. 22, 2010, Feb. 24, 2010 (Feb. 24, 2010), XP050421968, [retrieved on Feb. 24, 2010].

Huawei et al., "Changing eNB number of transmit antenna for energy saving", 3GPP Draft; R2-103403 Changing Number of Antenna for Energy Saving, 3rd Generation Partnership Project (3GPP), Mobile Competence Centre ; 650, Route Des Lucioles ; F-06921 Sophia-Antipolis Cedex ; France, vol. RAN WG2, no. Montreal, Canada; May 10, 2010, May 15, 2010 (May 15, 2010), XP050423455, [retrieved on May 15, 2010].

International Search Report and Written Opinion—PCT/US2011/041280—ISA/EPO—Jan. 13, 2012.

Partial International Search Report—PCT/US2011/041280, ISA/EPO—Sep. 19, 2011.

Huawei: "CR for eNB Power Saving by Changing Antenna Number", 3GPP TSG-RAN WG2 Meeting #67, R2-094687, Aug. 28, 2009, 24 Pages.

Huawei, "eNB power saving by changing antenna number [online]", 3GPP TSG-RAN WG2#6 R2-094677, <URL:http://www.3gpp.org/ftp/tsg_ran/WG2_RL2/TSGR2_67/Docs/R2-094677.zip>, Aug. 18, 2009.

Nortel, "Discussion on the Improvement of the Blind Detection of the Antenna Configuration [online]", 3GPP TSG-RAN WG1#50 R1-073970, <URL: http://www.3gpp.org/ftp/tsg_ran/WG1_RL1/TSGR1_50b/Docs/R1-073970.zip>, Oct. 2007.

QUALCOMM Europe: "MIMO proposal for MIMO-WCDMA evaluation", 3GPP TSG-RAN WG1#42, R1-050912, Aug. 29-Sep. 2, 2005, pp. 21.

\* cited by examiner

ENERGY SAVING MODE WITH MAINTAINED NUMBER OF ADVERTISED TRANSMIT ANTENNAS

PRIORITY CLAIMS AND CROSS-REFERENCE TO RELATED APPLICATIONS

The present application is a divisional application of U.S. patent application Ser. No. 13/164,572, entitled "ENERGY SAVING MODE WITH MAINTAINED NUMBER OF ADVERTISED TRANSMIT ANTENNAS," filed Jun. 20, 2011, pending, which is assigned to the assignee of the present application and claims priority to U.S. Provisional Patent Application Ser. No. 61/357,019, entitled "ENERGY SAVING MODE WITH MAINTAINED NUMBER OF ADVERTISED TRANSMIT ANTENNAS," filed on Jun. 21, 2010, both of which are expressly incorporated herein by their entireties.

BACKGROUND

I. Field

Certain aspects of the present disclosure generally relate to wireless communications and, more particularly, to a method for disabling transmit chains without changing an advertised number of transmit antennas.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where each of the NS independent channels corresponds to a dimension. The MIMO system can provide improved performance (e.g., higher throughput and/or greater reliability) if the additional dimensionalities created by the multiple transmit and receive antennas are utilized.

While considerable focus is placed on conserving power in user equipments (UEs) in order to extend battery life, base stations used in MIMO systems often operate with relatively low efficiency power amplifiers. As a result, these base stations use relatively high power even when transmitting only common reference signals (CRS) and not actively serving users.

SUMMARY

Certain aspects of the present disclosure provide a method for wireless communications from a base station. The method generally includes signaling a number of transmit antennas and sending transmissions using a different number of transmit antennas than signaled.

Certain aspects of the present disclosure provide a method for wireless communications from a base station. The method generally includes sending transmissions using a first set of transmit antennas, disabling one or more transmit chains for a corresponding one or more physical antennas, resulting in a reduced number of active transmit chains, signaling a number of antennas based on the first set of transmit antennas, after the disabling, and sending transmissions using antennas of the reduced number of active transmit chains, wherein the number of antennas used for transmission with the reduced number of active transmit chains is less than the signaled number of antennas.

Certain aspects of the present disclosure provide a method for wireless communications from a base station. The method generally includes monitoring transmissions to determine if a number of transmit antennas has been reduced at a base station by disabling transmit chains and modifying channel estimation processing functionality, in response to determining a number of transmit chains have been disabled.

Certain aspects of the present disclosure provide an apparatus for wireless communications from a base station. The apparatus generally includes means for signaling a number of transmit antennas and means for sending transmissions using a different number of transmit antennas than signaled.

Certain aspects of the present disclosure provide an apparatus for wireless communications from a base station. The apparatus generally includes means for sending transmissions using a first set of transmit antennas, means for disabling one or more transmit chains for a corresponding one or more physical antennas, resulting in a reduced number of active transmit chains, signaling a number of antennas based on the first set of transmit antennas, after the disabling, and means for sending transmissions using antennas of the reduced number of active transmit chains, wherein the number of antennas used for transmission with the reduced number of active transmit chains is less than the signaled number of antennas.

Certain aspects of the present disclosure provide an apparatus for wireless communications from a base station. The apparatus generally includes means for monitoring transmissions to determine if a number of transmit antennas has been reduced at a base station by disabling transmit chains and means for modifying channel estimation processing functionality, in response to determining a number of transmit chains have been disabled.

Certain aspects of the present disclosure provide an apparatus for wireless communications from a base station. The apparatus generally includes at least one processor configured to signal a number of transmit antennas and send transmissions using a different number of transmit antennas than signaled; and a memory coupled with the at least one antenna.

Certain aspects of the present disclosure provide an apparatus for wireless communications from a base station. The apparatus generally includes at least one processor configured to send transmissions using a first set of transmit antennas, disable one or more transmit chains for a corresponding one or more physical antennas, resulting in a reduced number of active transmit chains, signal a number of antennas based on the first set of transmit antennas, after the disabling, and send transmissions using antennas of the reduced number of active transmit chains, wherein the number of antennas used for transmission with the reduced number of active transmit chains is less than the signaled number of antennas.

Certain aspects of the present disclosure provide an apparatus for wireless communications from a base station. The apparatus generally includes at least one processor configured to monitor transmissions to determine if a number of transmit antennas has been reduced at a base station by disabling transmit chains and modifying channel estimation processing functionality, in response to determining a number of transmit chains have been disabled.

Certain aspects of the present disclosure provide a computer-program product comprising a computer-readable medium having instructions stored thereon, the instructions executable by one or more processors for signaling a number of transmit antennas and sending transmissions using a different number of transmit antennas than signaled; and a memory coupled with the at least one antenna.

Certain aspects of the present disclosure provide a computer-program product comprising a computer-readable medium having instructions stored thereon, the instructions executable by one or more processors for sending transmissions using a first set of transmit antennas, disabling one or more transmit chains for a corresponding one or more physical antennas, resulting in a reduced number of active transmit chains, signaling a number of antennas based on the first set of transmit antennas, after the disabling, and sending transmissions using antennas of the reduced number of active transmit chains, wherein the number of antennas used for transmission with the reduced number of active transmit chains is less than the signaled number of antennas.

Certain aspects of the present disclosure provide a computer-program product comprising a computer-readable medium having instructions stored thereon, the instructions executable by one or more processors for monitoring transmissions to determine if a number of transmit antennas has been reduced at a base station by disabling transmit chains and modifying channel estimation processing functionality, in response to determining a number of transmit chains have been disabled.

DETAILED DESCRIPTION

Certain aspects of the present disclosure provide techniques that may be utilized to help reduce power consumption by a base station by disabling one or more transmit chains, for example, when traffic demand of UEs served by the base station is low. Because UEs may not be configured to support dynamic changes in a number of transmit antennas used, the base station may continue to advertise the same number of transmit antennas, even after disabling the one or more transmit chains.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
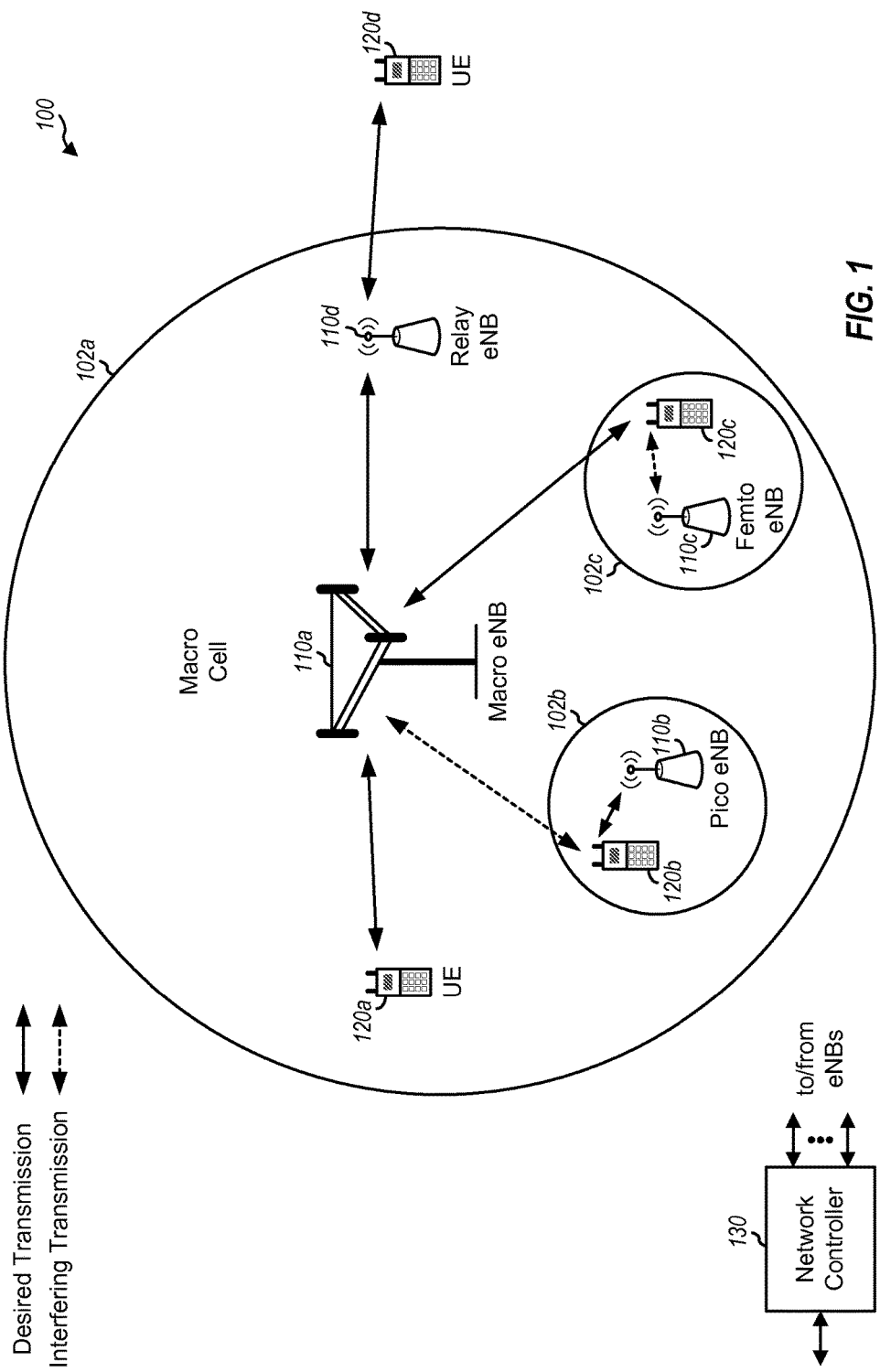
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB," "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
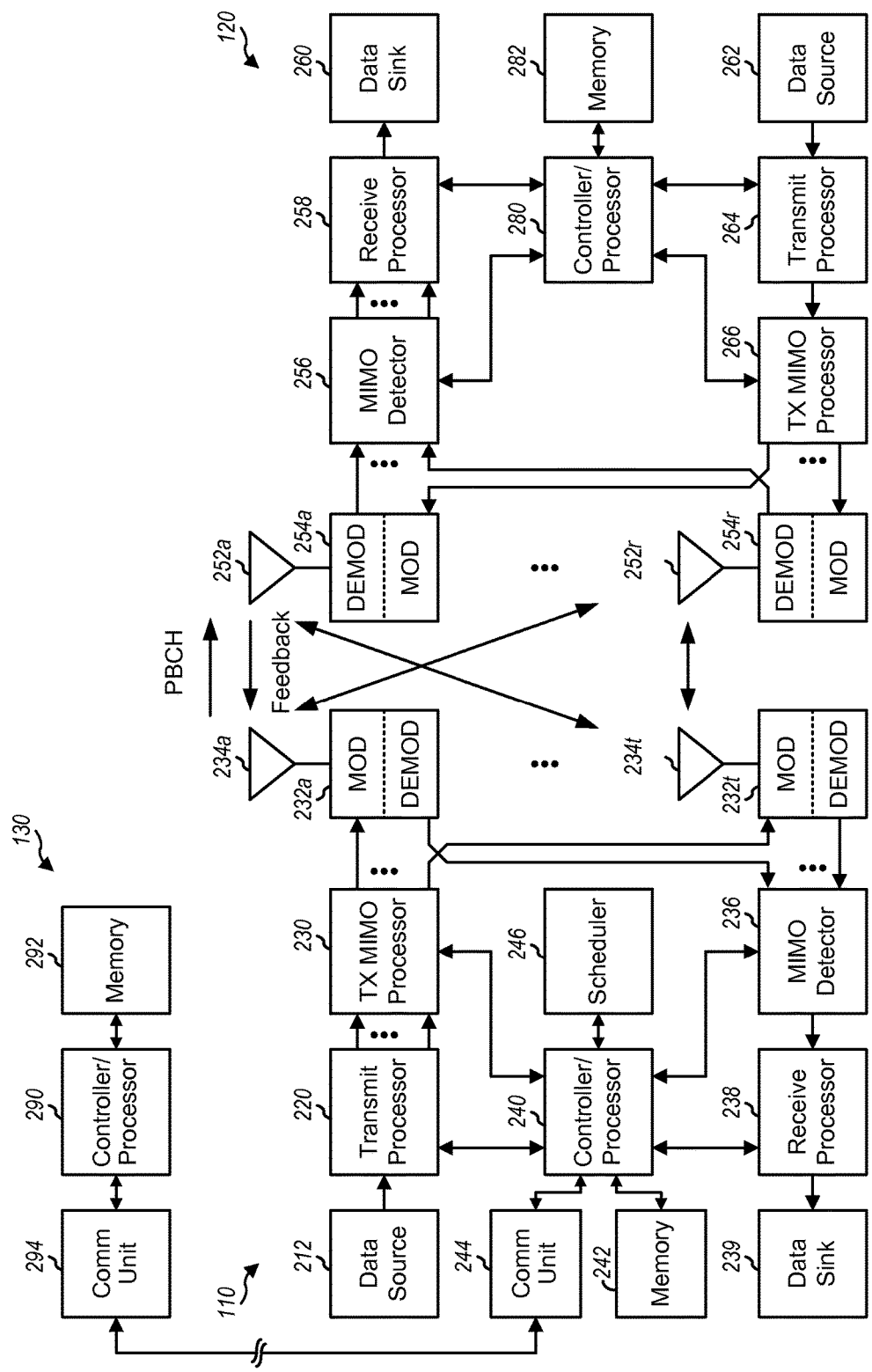
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations 600 of FIG. 6 and/or other processes for the techniques described herein. Memories 242 and 282 may store data and program codes for base station 110 and UE 120, respectively. A scheduler 244 may schedule UEs for data transmission on the downlink and/or uplink.

As will be described in further detail below, the base station 110 may be configured to reduce the number of antennas 234 used (by disabling one or more corresponding transmit chains), while still advertising the original (non-reduced) number of transmit antennas. According to certain aspects, the number of antennas may be signaled by scrambling a CRC for a PBCH sent from the base station 110 using a scrambling code dependent on the number of transmit antennas. Thus, the UE 120 may only get a successful CRC match if using the original number of transmit antennas, even after the number of transmit antennas has been reduced.

As will be described in greater detail below, according to certain aspects, the UE 120 may determine the actual number of transmit antennas used and modify channel estimation processing functionality accordingly. In this manner, feedback provided by the UE 120, for example, with Reference Signal Received Power (RSRP) or Reference Signal Received Quality (RSRQ) measurements, may be compensated for the reduction in transmit antennas and/or certain processing may be disabled to conserve power. According to certain aspects, the base station 110 may select a permutation matrix designed to compensate for the reduction in transmit antennas, for example, by summing virtual antenna port signals and mapping the summed signal to one of the actual transmit antennas used.

Figure 3:
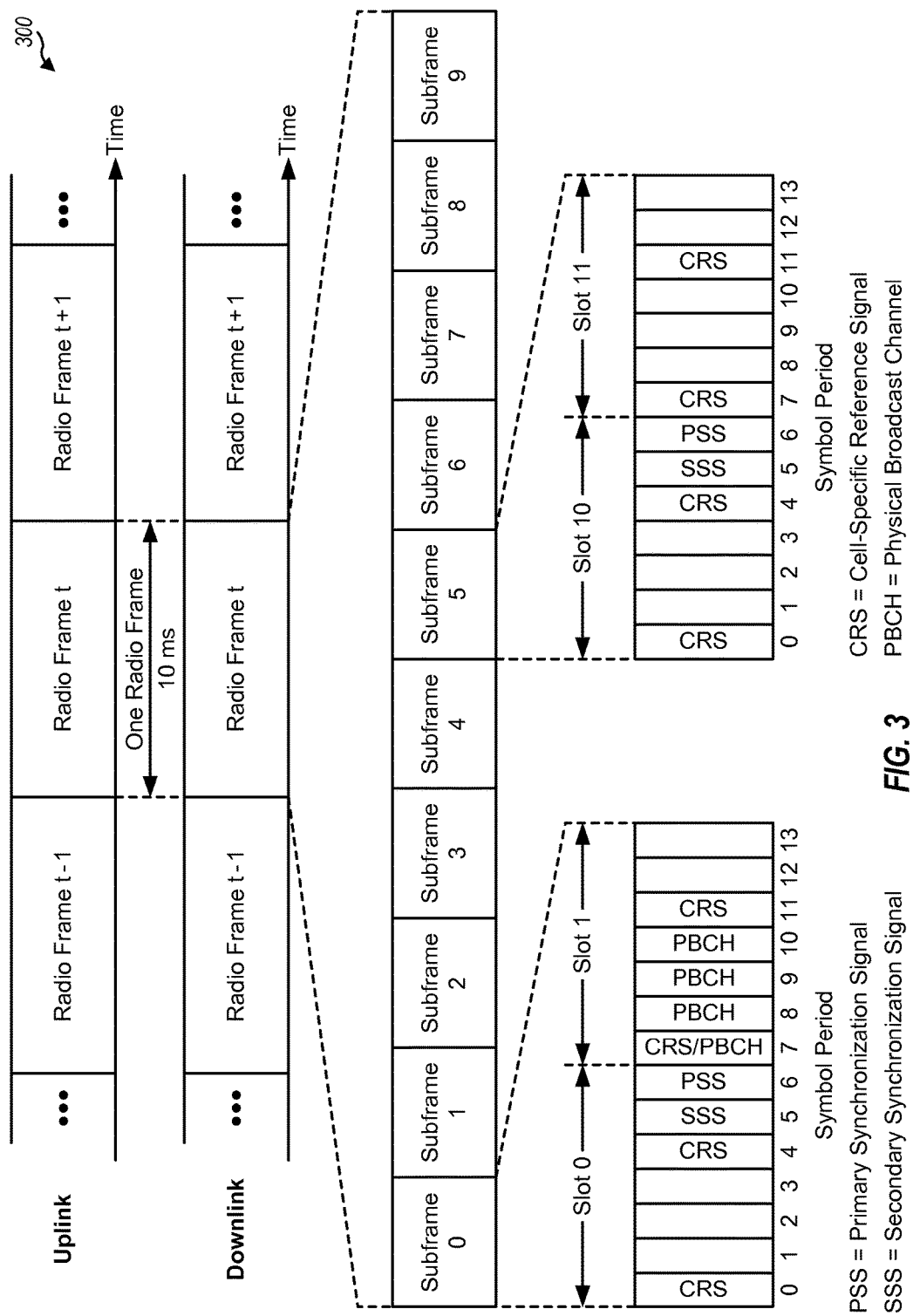
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
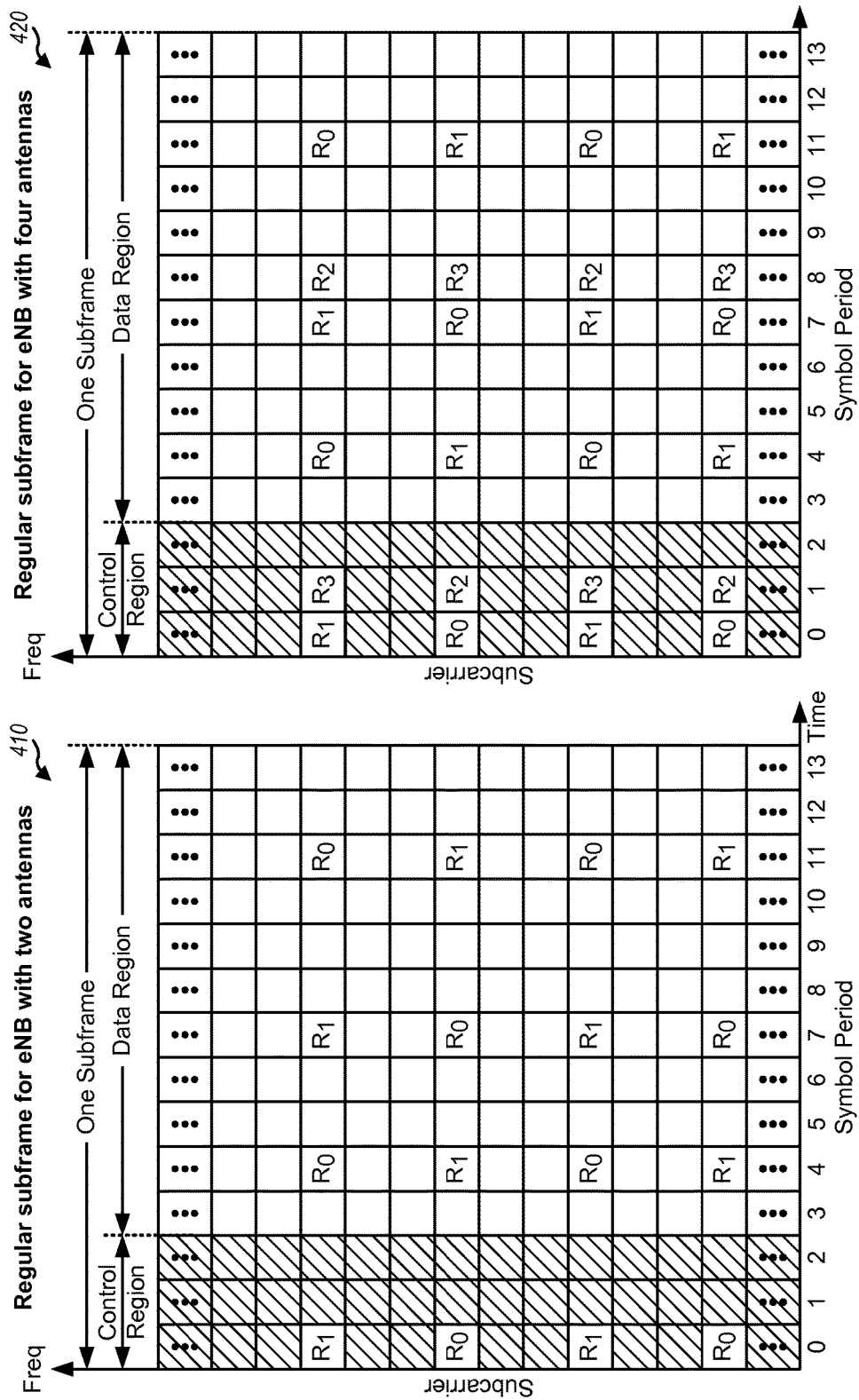
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

EXAMPLE DISABLING OF TRANSMIT CHAINS

As described above, even when transmitting only CRS, a base station may operate a number of relatively inefficient power amplifiers.

A base station may attempt to save energy in various ways. As an example, a base station may try and save energy by reducing the frequency of CRS transmissions (e.g., by configuring MBSFN subframes-and not transmitting on subframes designated as MBSFN), reducing the transmission bandwidth (BW). Rather than transmit an MBSFN, the base station may send only pilots in the subframe and may further reduce transmit power consumption by sending only a fraction of pilots. However, there is typically a limit in the number of subframes that can be designated as MBSFN subframes.

According to certain aspects of the present disclosure, the number of antennas used for transmission may be reduced, reducing the number of active transmit chains and reducing power consumption accordingly. According to certain protocols, however, reducing the number of transmit antennas in a dynamic manner may not be supported. Therefore, according to certain aspects, the base station may continue to advertise a previous number of transmit antennas, even after reducing the number of active transmit chains. In other words, the base station may transmit using a reduced number of antennas, while advertising a greater number of transmit antennas.

The techniques presented herein may also be used in coordinated multi-point (CoMP) transmission scenarios, for example, when a remote radio head (RRH) uses a different number of antenna ports when compared to a donor eNB, but the advertised number of antenna ports has to be the same because RRH and eNB use the same Cell ID. In other words, while examples below refer to reducing the number of transmit chains to reduce power, the techniques may be more broadly applied to any scenario when a different number of transmit antennas is advertised than actually used for transmission.

Figure 5:
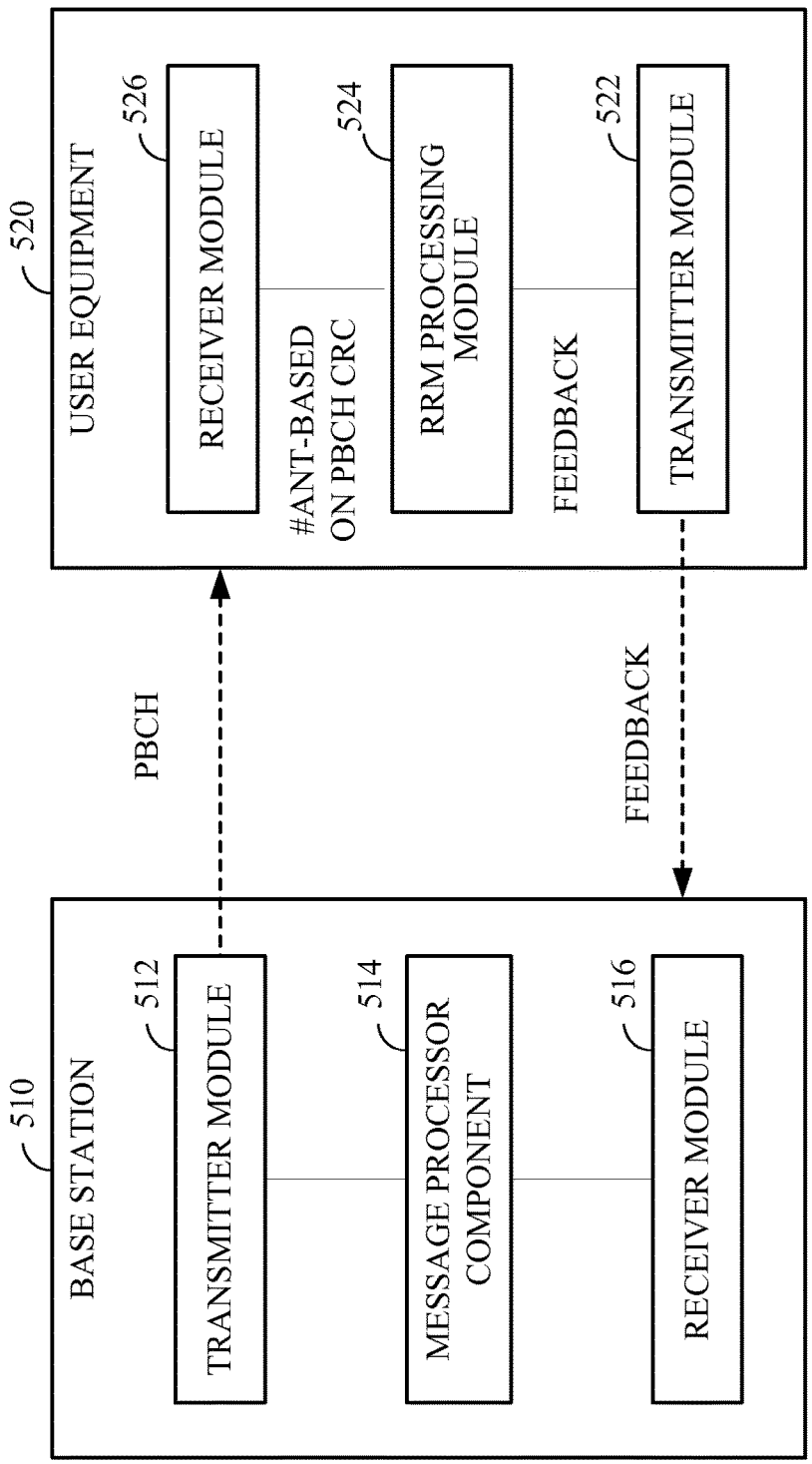
FIG. 5 shows an exemplary base station and user equipment.

FIG. 5 illustrates an example wireless system 500 with a base station (or eNodeB) 510 and UE 520 capable of operating in accordance with certain aspects of the present disclosure.

According to certain aspects, the base station may dynamically change the number of transmit antennas used, by enabling/disabling transmit chains of a transmitter module 512. For example, if there are no connected UEs (e.g., all UEs are in idle mode), the BS 510 may reduce transmit chains to reduce power consumption resulting from transmitting reference signals. As UEs become connected, the BS 510 may re-enable the transmit chains. As another example, a UE may disable transmit chains while a UE has receivers disabled in a discontinuous reception (DRX) mode, and enable the transmit chains in conjunction with the UE enabling its receivers.

As illustrated, the base station 510 may also include a message processing component 514. The message processing component 514 may be configured to generate a message, such as a physical broadcast channel (PBCH), to be transmitted to the UE 520, via a transmitter module 512. The base station 510 may signal a fewer number of transmit antennas than actually used, for example, by continuing to scramble a CRC of the PBCH as if the number of transmit antennas has not changed.

In this example, the UE 520 may receive the PBCH and determine a corresponding number of antennas, based on the CRC. For example, the UE 520 may try and decode the PBCH based on a first assumption of transmit antennas (a first hypothesis) and if the checksum fails based on this first assumption, the UE may again decode assuming a different number of transmit antennas (a different hypothesis). This process may be repeated until a checksum succeeds.

As will be described in greater detail below, in some cases, the UE 520 may determine an actual number of transmit antennas used (e.g., different than the number of antennas indicated by the PBCH CRC) by monitoring for actual transmissions from different antennas. In such cases, a RRM processing module 524 may take the actual number of transmit antennas into account when generating feedback. For example, when calculating RSRP and/or RSRQ, rather than average RS signals transmitted from multiple antennas, since one of the multiple antennas may not actually be active, the RRM processing module may only consider RS for the actual active antenna.

In any case, the UE 520 may transmit feedback to the BS 510, via a transmitter module 522. The feedback may be received by a receiver module 516 of the base station 510 and used to adjust transmission properties and make various decisions (e.g., regarding scheduling, handover, and the like).

In some cases, the base station 510 may select a particular permutation matrix for use when sending transmissions using antennas of the reduced number of active transmit chains. The permutation matrix may be designed to achieve a particular result. As an example, the base station 510 may select a permutation matrix that results in summing of at least two virtual antenna port signals and mapping the summed signal for transmission via an antenna of an active transmit chain.

Such permutation matrices may be used, for example, when transmitting on one antenna while advertising two antennas or when transmitting on two antennas while advertising four antennas. This approach may help a UE achieve more accurate measurement reports, in the event the UE does not compensate, itself, for the reduced number of transmit antennas.

Figure 6:
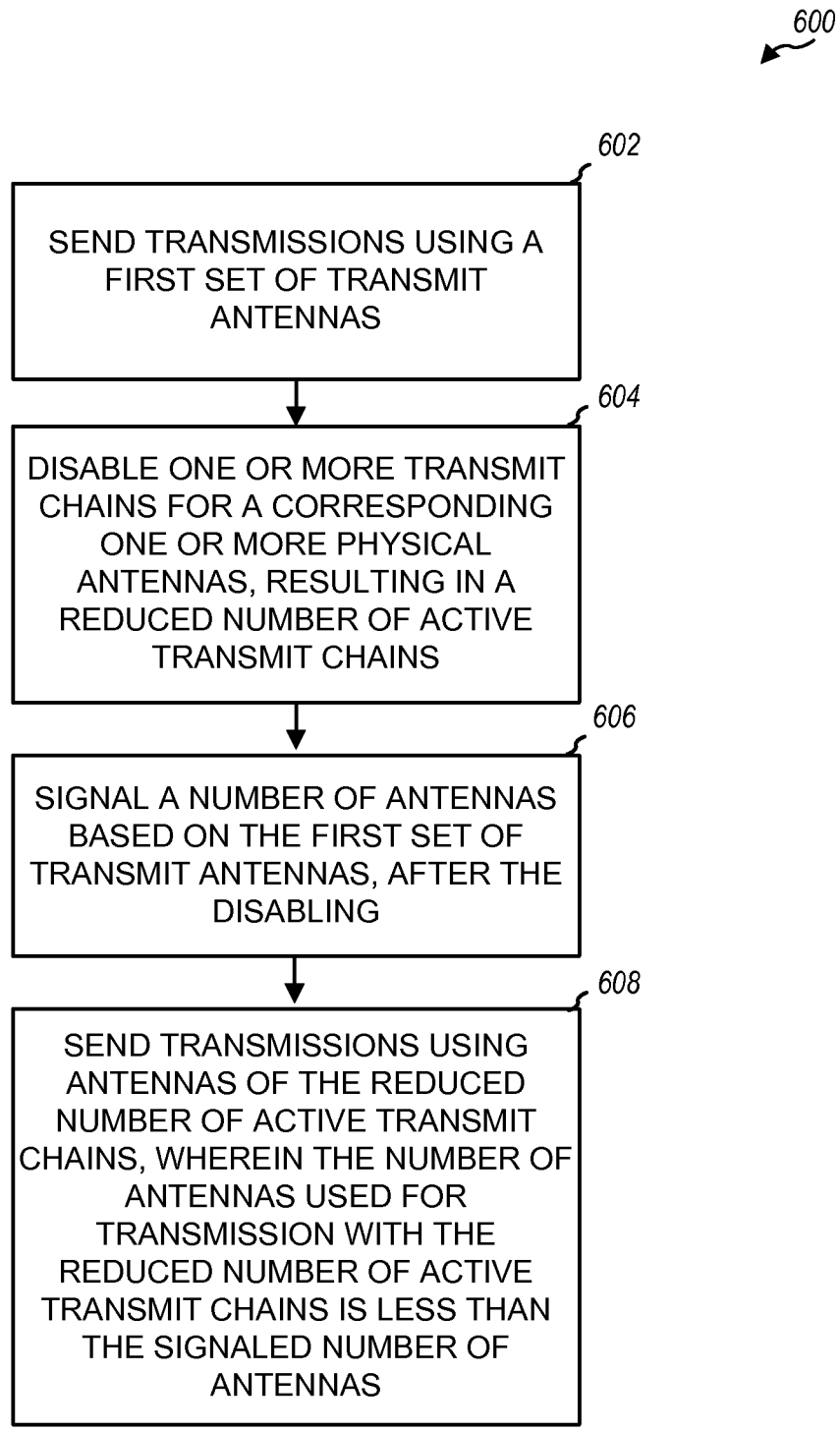
FIG. 6 illustrates example operations that may be performed by a base station, in accordance with certain aspects of the present disclosure.

FIG. 6 illustrates example operations 600 that may be performed by a base station (node B) in accordance with certain aspects of the present disclosure. For example, the operations 600 may be performed by base station 510 of FIG. 5.

The operations 600 begin, at 602, by sending transmissions using a first set of transmit antennas. At 604, the base station may disable one or more transmit chains, resulting in a reduced number of active transmit chains. At 606, the base station may signal a number of antennas based on the first set of transmit antennas, after the disabling.

At 608, the base station may send transmissions using antennas of the reduced number of active transmit chains, wherein the number of antennas used for transmission with the reduced number of active transmit chains is less than the signaled number of antennas.

As noted above, the number of antennas may be signaled by scrambling the CRC of a PBCH based on a scrambling code corresponding to a previously used number of transmit antennas. As noted above, the base station may re-enable transmit chains as conditions change (e.g., UEs become connected, etc.). Further, the base station may also utilize different permutation matrices when different numbers of transmit chains are enabled.

While the number of transmit antennas may not change when reducing the number of transmit chains, so-called legacy UEs (e.g., that do not support dynamic changes in the number of transmit antennas) may still observe a change when the number of transmit chains is reduced. For example, the UEs may observe a reduction in transmission power (from the disabled antennas) similar to fading.

In some cases, the observed effect may depend on which transmit chains are disabled. As an example, when the base station reduces the number of Tx antennas from 4 to 2, there may be no degradation in the SFBC processing and there may be no change in the UEs RSRP and RSRQ measurements. This is because the UE may be mandated not to use the third and fourth eNB Tx antennas in the RSRP and RSRQ measurements. When the eNB reduces the number of Tx antennas from 2 to 1, there may be no degradation in the SFBC processing, but there may be inconsistency between RSRP and RSRQ measurements from different UEs. This is because the UEs are allowed but not mandated to average RSRP over two eNB Tx antennas. When the UE is not averaging measurements over the first and second eNB Tx antennas, the UE is mandated to use the first eNB Tx antenna only for measurements.

To account for this, so-called non-legacy UEs (e.g., LTE Rel-10 UEs) may implement an algorithm where a number of received TX antenna port signals are monitored. In this case, when a Tx antenna port appears to be absent for an extended period of time, the UE may modify channel estimation processing. For example, related channel estimation processing in the UE may be turned off, after which the UE only periodically checks whether the turned off antenna signal reappears. As another example, also noted above, a UE may refrain from averaging RS for multiple antennas when calculating RSRP and/or RSRQ and, instead, use a single antenna RS.

Figure 7:
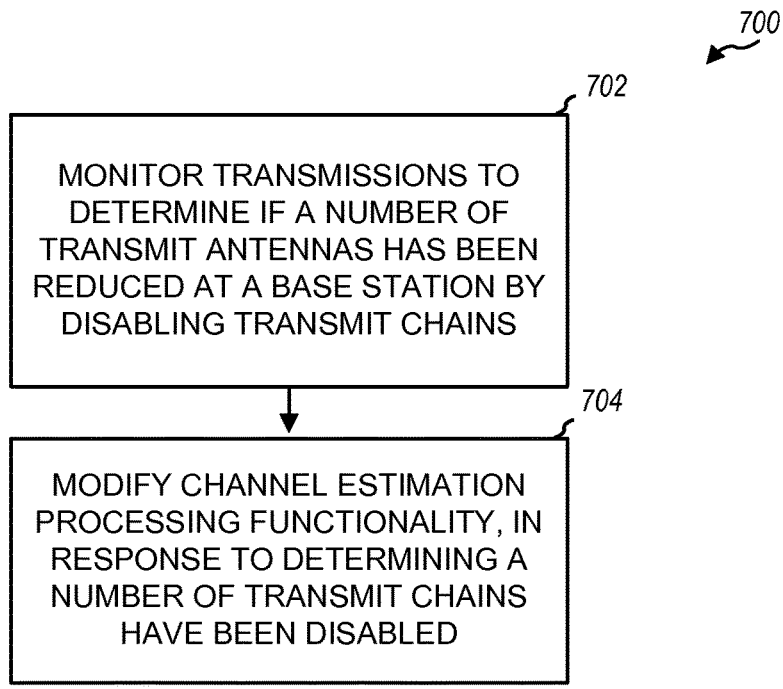
FIG. 7 illustrates example operations that may be performed by a user equipment (UE), in accordance with certain aspects of the present disclosure.

FIG. 7 illustrates example operations 700 a UE may perform to modify channel estimation based on the actual number of transmit antennas used. The operations 700 may be performed, for example, by UE 520 of FIG. 5.

According to certain aspects, some UEs may monitor transmissions (at 702) and determine if a number of transmit antennas used has been reduced (e.g., despite a different number being advertised). As an example, a UE may monitor transmissions and determine transmit antennas corresponding to one or more disabled transmit chains are not being used.

At 704, the UE may modify channel estimation processing functionality in response to determining a number of transmit chains has been disabled. As noted above, in an effort to reduce power consumption, the UE may disable related channel estimation processing functionality corresponding to the disabled transmit antennas. The UE may continue to monitor transmissions to determine if disabled transmit chains have been re-enabled and, if so, again modify the channel estimation processing functionality (e.g., to re-enable previously disabled channel estimation functionality or modify how RSRP and/or RSRQ is calculated).

Figure 8:
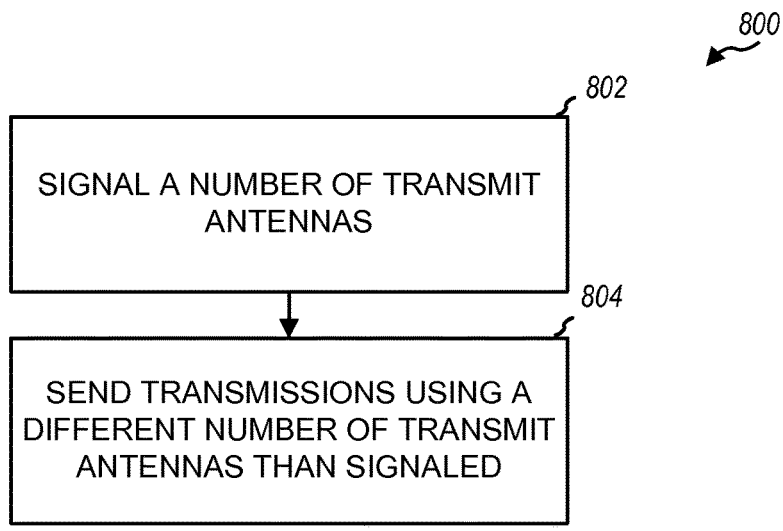
FIG. 8 illustrates example operations that may be performed by a base station, in accordance with certain aspects of the present disclosure.

As noted above, the techniques presented herein may be broadly applied to any scenario when a different number of transmit antennas is advertised than actually used. FIG. 8 illustrates example operations 800 for such a scenario.

The operations 800 begin, at 802, by signaling a number of transmit antennas. At 804, transmissions are sent using a different number of transmit antennas than signaled. The operations may be performed, for example, by a remote radio head (RRH) in coordinated multi-point (CoMP) transmissions using a different number of antenna ports when compared to a donor eNB. In some cases, the RRH may not even have as many transmit antennas as advertised.

When the CoMP eNB or RRH uses a smaller number of eNB antenna ports than advertised, the same technique as described before can be used for turning off individual transmit chains. In addition, it is also possible for a CoMP eNB or RRH to transmit a virtualized transmit signal instead. For example, the sum of signals intended for two Tx antennas can be transmitted on a single antenna, for example. In general, the transmit signals for N Tx antennas can be transmitted using M physical Tx antennas by first multiplying the transmit signals with a M×N linear matrix. Note that such operation may increase the per tone peak-to-average value of the transmitted signal; however, due to the nature of the OFDM signal, the time domain peak-to-average power ratio may not increase. Transmitting virtualized signals may provide only limited energy savings but it is useful in the CoMP scenario, especially with active connected UEs.

The antenna virtualization technique mentioned above may offer lower energy savings due to the fact that multiple pilots still need to be transmitted. Although the power consumption of low power RRH stations may not be a concern in general, the eNB may switch between antenna virtualization and antenna turn-off depending on the presence of active UEs in order to maximize energy saving opportunities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment, comprising:
    receiving signaling indicating a number of transmit antennas used for transmissions from a base station;
    monitoring the transmissions to determine if a number of transmit antennas has been disabled at the base station; and
    modifying channel estimation processing functionality, in response to determining the number of transmit antennas have been disabled, wherein the modifying comprises:
        utilizing reference signals, received for fewer than the indicated number of transmit antennas, when calculating one or more signal parameters for the channel estimation processing functionality.

2. The method of claim 1, wherein the modifying further comprises disabling channel estimation processing functionality.

3. The method of claim 1, further comprising:
    continuing to monitor transmissions to determine if disabled transmit antennas have been re-enabled.

4. The method of claim 3, further comprising:
    modifying channel estimation processing functionality to a previous state, in response to determining a number of transmit antennas have been re-enabled.

5. The method of claim 3, wherein continuing to monitor transmissions to determine if disabled transmit antennas have been re-enabled comprises periodically monitoring transmissions to determine if disabled transmit antennas have been re-enabled.

6. An apparatus for wireless communications, comprising:
    means for receiving signaling indicating a number of transmit antennas used for transmissions from a base station;
    means for monitoring the transmissions to determine if a number of transmit antennas has been disabled at the base station; and
    means for modifying channel estimation processing functionality, in response to determining the number of transmit antennas have been disabled, and wherein the means for modifying comprises:
        means for utilizing reference signals, received for fewer than the indicated number of transmit antennas, when calculating one or more signal parameters for the channel estimation processing functionality.

7. The apparatus of claim 6, wherein the means for modifying further comprises disabling channel estimation processing functionality.

8. The apparatus of claim 6, further comprising:
    means for continuing to monitor transmissions to determine if disabled transmit antennas have been re-enabled.

9. The apparatus of claim 8, further comprising:
    means for modifying channel estimation processing functionality to a previous state, in response to determining a number of transmit antennas have been re-enabled.

10. The apparatus of claim 8, wherein the means for continuing to monitor transmissions to determine if disabled transmit antennas have been re-enabled comprises means for periodically monitoring transmissions to determine if disabled transmit antennas have been re-enabled.

11. An apparatus for wireless communications, comprising:
    at least one processor configured to monitor transmissions to determine if a number of transmit antennas has been disabled at a base station and modify channel estimation processing functionality, in response to determining the number of transmit antennas have been disabled, wherein the at least one processor is configured to modify the channel estimation processing by utilizing reference signals received for fewer than an advertised number of antennas when calculating one or more signal parameters for the channel estimation processing functionality; and
    a memory coupled with the at least one processor.

12. A non-transitory computer-readable medium having instructions stored thereon, the instructions executable by one or more processors for:
    monitoring transmissions to determine if a number of transmit antennas has been disabled at a base station; and
    modifying channel estimation processing functionality, in response to determining the number of transmit antennas have been disabled, wherein the modifying comprises utilizing reference signals received for fewer than an advertised number of antennas when calculating one or more signal parameters for the channel estimation processing functionality.

* * * * *